United States Patent [19]

Kamerbeek et al.

[11] 3,842,492

[45] Oct. 22, 1974

[54] METHOD OF PROVIDING CONDUCTOR LEADS FOR A SEMICONDUCTOR BODY

[75] Inventors: Djuurd Anne Geertruid Kamerbeek; Johannes Theodorus Van De Water, both of Mollenhutseweg, Netherlands

[73] Assignee: U.S. Philips Corporation, New York, N.Y.

[22] Filed: Dec. 2, 1971

[21] Appl. No.: 204,114

[30] Foreign Application Priority Data

Dec. 17, 1970 Netherlands ....................... 7018378

[52] U.S. Cl. .................................... 29/588, 29/627

[51] Int. Cl. ............................................. B01j 17/00

[58] Field of Search .................. 29/576 S, 588, 627; 174/DIG. 3

[56] References Cited

UNITED STATES PATENTS

| | | | |
|---|---|---|---|
| 3,262,022 | 7/1966 | Caracciolo | 29/576 S |
| 3,431,092 | 3/1969 | Lehner | 29/588 |
| 3,482,419 | 12/1969 | Rogers | 65/36 |
| 3,487,541 | 1/1970 | Boswell | 174/DIG. 3 |
| 3,494,022 | 2/1970 | Maute | 29/588 |
| 3,689,336 | 9/1972 | Bunker | 174/DIG. 3 |
| 3,702,954 | 11/1972 | Mosch | 317/234 |

*Primary Examiner*—W. Tupman
*Attorney, Agent, or Firm*—Frank R. Trifari

[57] ABSTRACT

A method of manufacturing a semiconductor device in which a semiconductor body is secured to a support, contact pads on the semiconductor body are connected, by means of wires, to one end of current conductors and an envelope of synthetic resin is provided. The current conductors are formed from a metal strip into a conductor grid having the ends which will be adjacent the semiconductor body connected together by means of a connection strip. The connection strip is then cut between juxtaposed conductors to form widened conductor ends for more secure encapsulation. Several methods are described for insulating the widened ends from one another.

7 Claims, 7 Drawing Figures

INVENTORS
DJUURD A.G. KAMERBEEK
JOHANNES TH. VAN DE WATER
BY
AGENT

INVENTORS
DJUURD A.G. KAMERBEEK
JOHANNES TH. VAN DE WATER
BY
Frank R. Trifari
AGENT

INVENTORS
DJUURD A.G. KAMERBEEK
JOHANNES TH. VAN DE WATER
BY
AGENT

METHOD OF PROVIDING CONDUCTOR LEADS FOR A SEMICONDUCTOR BODY

The invention relates to a method of manufacturing a semiconductor device in which a conductor grid, which is formed from a metal strip is used and the conductors of which are incorporated at one end in a supporting member and are connected at their other end by means of wires to contact places of a semiconductor body which is secured to a support, after which an envelope of a synthetic resin is provided.

In manufacturing semiconductor devices comprising an envelope of a synthetic resin and a semiconductor body, for example, an integrated circuit, the conductor grid is usually etched from a metal strip. This method of manufacturing enables a comparatively great fineness of the conductor pattern to be obtained. The conductor width and the distance between the conductors is in the order of magnitude of the thickness of the materials, for example, a few hundreds of microns. The drawback of etching is that the cost of manufacture become comparatively high.

A considerably cheaper method of manufacturing the conductor grid is the punching from a metal strip. However, in the case of a fine conductor pattern the punching method cannot be realized for series production as a result of the considerable wear of the punching tools of minimum dimensions.

The requirements which are imposed upon a conductor pattern are, inter alia:

a.

a minimum distance between the conductor ends and the semiconductor body. A connection wire which is as short as possible between the conductor ends and the contact places on the semiconductor body is to be realised. This maintains the price of the gold connection wires low, simplifies the manufacture of the semiconductor device and prevents the possibility of mutual shortcircuit of the wires upon providing the envelope of synthetic resin;

b.

a widened conductor end. The widened conductor ends form an anchoring in the synthetic resin as a result of which mutual movements upon thermal load of the semiconductor device are prevented. This movement may occur as a result of the difference in coefficients of expansion of the conductors and the envelope of synthetic resin and may cause the working-loose of the wire connection on the conductor ends. On the other hand a widened conductor end is favourable to connect the wires to said ends;

c.

a comparatively large distance between the conductors. A cheap grid can be obtained since the manufacture is simple. Punching in series manufacture, for example, is readily possible.

So far it has not been found possible to fulfil each of the above-mentioned requirements. Requirement *a* can be realised only in the case of a great fineness of the conductor grid. The requirements *b* and *c*, however, cannot be realised in the case of a fine grid.

It is the object of the invention to provide a method of manufacturing a semiconductor device in which the manufacture is comparatively cheap, short connection wires can be used, a considerably widened conductor end can be obtained and in which the distance between the conductors nevertheless is comparatively large. In order to reach the end in view, according to the invention, during the formation of the conductor grid, the ends remote from the supporting member of at least a number of juxtaposed conductors remain connected together by means of a connection strip, the connection strip is cut between juxtaposed conductors and the juxtaposed parts of the connection strip are insulated electrically from each other during or after cutting. The support is preferably formed as an integrating part of the grid.

The method according to the invention results in a semiconductor device which presents considerable advantages as a result of the method of manufacturing the grid. The mutually cut parts of the connection strip constitute considerably widened ends of the conductors. These widened ends ensure a very good anchoring of the conductor ends in the synthetic resin of the envelope. Furthermore, the connection of the wires to said widened conductor ends is simple. Although the conductor ends are wide, a comparatively large distance exists nevertheless between the conductors. This enables a manufacture by means of punching in series production since the punching tool can have sufficiently large dimensions so that strong detrition is prevented. The conductors may also extend to near the support, since the widened form of the free ends of the conductors is obtained as a result of cutting. Cutting is to be understood to have a wide meaning; it may be, for example, clipping but also severing in other manners, for example, by means of a laser beam. For the electric insulation of the conductor ends, the juxtaposed widened conductor ends may be provided at different levels. This can be done, for example, by bending one of two juxtaposed conductors out of the plane of the grid. It is alternatively possible to twist the conductors relative to each other in such manner that juxtaposed cutting surfaces lie at different levels. It is furthermore also possible to give the cut a small width which is sufficient, however, for electric insulation. This could be done, for example, by means of a laser beam. The provision of the widened conductor ends at different levels can be carried out both prior to and after connecting the semiconductor body to the support and both prior to and after providing the connection wires of the semiconductor device to the conductor ends.

The invention also relates to a semiconductor device comprising a support on which a semiconductor body is secured, conductors which are directed with one end to the semiconductor body, of which ends at least a number have a widened part, connection wires between contact places on the semiconductor body and the said conductors and an envelope of a synthetic resin. According to the invention, the semiconductor device is characterized in that widened parts which face each other and are lying on juxtaposed conductor ends, viewed in a direction normal to the main surface of the semiconductor body, reach substantially to against each other, the widened parts of the conductor ends consisting of cut parts of a metal connection strip. Such a semiconductor device is reliable in operation and simple to manufacture.

The invention furthermore relates to a metal conductor grid for use in the manufacture of a semiconductor device in which the conductors are incorporated at one end in a supporting member. According to the invention, at least a number of the ends of the conductors remote from the supporting member are connected together by means of a connection strip.

In an embodiment, the connection strip is constructed as a closed frame. The conductor grid may also be provided with at least two connection strips which together constitute an interrupted frame. In this case the supporting member will also be in the form of a frame, the conductors changing into the frame on at least two oppositely located sides. Of course it is also possible to give the grid a different shape, for example, that of a comb. In that case the conductor ends will generally be connected by a straight connection strip.

In order that the invention may be readily carried into effect, it will now be described in greater detail, by way of example, with reference to the accompanying drawings, in which.

Figure 1:
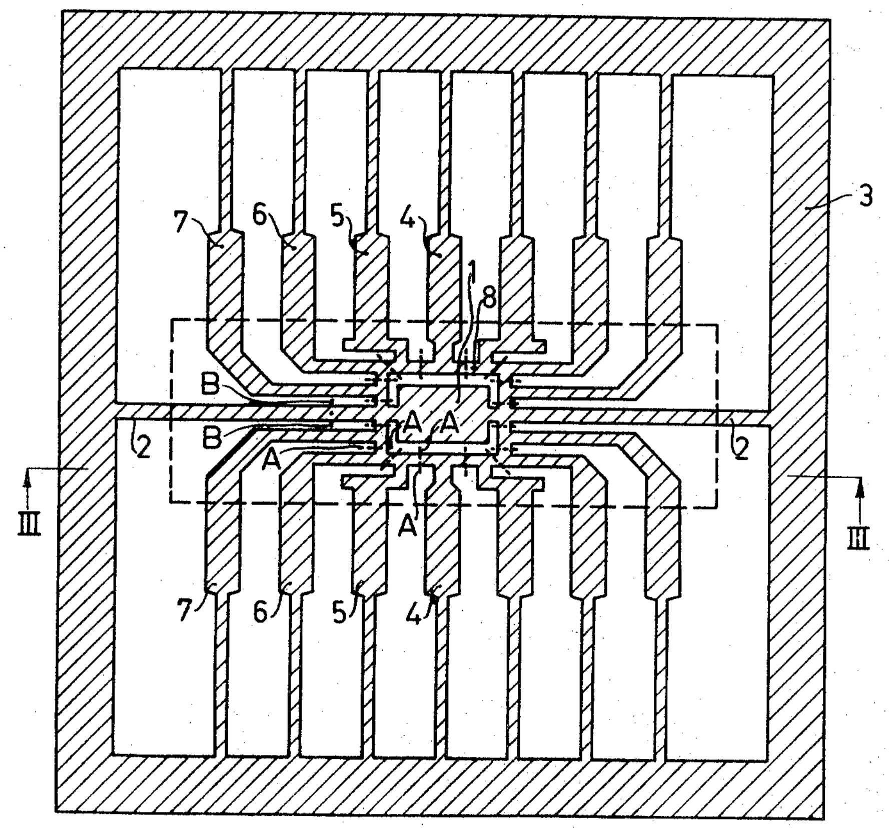
FIG. 1 shows an embodiment of a grid.

FIG. 1 shows a conductor grid for an integrated circuit which is constituted by a strip of metal, for example, an iron-nickel-cobalt alloy. The conductor grid comprises a support 1 on which a semiconductor body can be secured. The support is held by means of bands 2 by a supporting member 3 which in this embodiment has the shape of a frame surrounding the conductors. The ends of the conductors facing the support 1 are all connected together by means of a connection strip 8 which is in the form of a frame. The dimension of the envelope of synthetic resin to be provided afterwards is shown in broken lines.

Such a grid can be formed both by means of punching and by means of etching; punching, however, can present great price advantages in series production. In punching the grid, however, the nipples of the punch should have a sufficient rigidity to avoid rapid detrition. Therefore, in series manufacture of the grid the nipples may not have too small dimensions, and minimum dimensions of 1.5 times the thickness of the strip should be maintained. In known conductor grids, however, it is then impossible to provide the ends of the conductor which face the support and which are very fine in shape and are situated very close together with a broad widening and to let the conductors moreover approach the support very closely. The widened part is necessary to anchor the free ends of the conductors rigidly in the envelope of synthetic resin to be provided. A mechanical anchoring of the conductors in the synthetic resin can be realised in various manners. The anchoring of the conductor ends, and that in particular of the conductor ends which are situated in the envelope of synthetic resin of a comparatively large length, however, has a very important further object. In the case of thermal load of the semiconductor device, the conductor ends can actually not move relative to the synthetic resin in spite of the mutual differences in coefficients of expansion. In this manner it is prevented that upon thermal load wires which connect the conductor ends to contact laces on the semiconductor body will tear loose from the conductor ends. As a result of the widened part, a large connection surface for the wires is also obtained so that the provision of the wires is simplified. The conductor ends must be situated close to the support so that short wires can be used.

In the grid shown, the widened parts of the conductors which are situated near the support are formed elegantly. The desirable shape and size is obtained by cutting the connection strip 8 in the places A—A, for example, by means of a clipping tool. The conductor ends are then close to the support and also have a widening of maximum size. A very favourable anchoring in the envelope of synthetic resin can thus be obtained while a large connection pad for the wires is present. In order to insulate the conductors mutually with absolute certainty, for example, the free ends of the conductors 5 and 7 are bent upwards or downwards relative to the plane of the grid over a small distance. The insulation relative to the frame 3 is carried out in the usual manner by cutting loose the conductors near the frame after manufacturing the semiconductor device. A conductor grid which satisfies all the requirements to be imposed is thus obtained in a simple and cheap manner.

Figure 2:
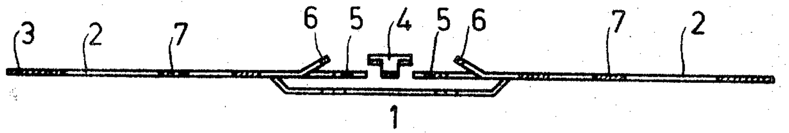
FIG. 2 is a sectional view taken on the line III—III of FIG. 1.
Figure 3:
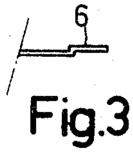
FIG. 3 is a side elevation of a conductor bent out of the plane of the conductor grid.

It is of course also possible to bring the ends of the conductors 4 and 6 at a level differing from the plane of the conductor grid or, for example, to bend the conductor ends alternately in different directions. When the conductors 4 and 6, for example, are bent upwards the parts of the connection strip on the bands 2 must also be insulated relative to the conductors 7. In practice, however, this involves no difficulties. Actually, it is conventional, in order to simplify the connection of the wires to the contact places of the semiconductor body and to the conductors, to bring the support slightly below the plane of the conductor grid so that the upper surface of the semiconductor body to be secured to the support lies at a lower level than the plane of the conductor grid. This deepening may be carried out, for example, along the lines B—B, the bands 2 being then automatically insulated from the conductors 7. FIG. 2 shows an example of this embodiment which is a cross sectional view taken on the line III—III of FIG. 1. The conductors may also be bent differently as is shown for the conductor 6 in FIG. 3.

Figure 4:
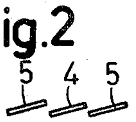
FIG. 4 is an elevation of three juxtaposed conductor ends of which the conductors are twisted in the same direction.

The conductors may also be insulated from each other in a different manner. For example, two juxtaposed conductors may be twisted in the same direction in which one of the cutting surfaces of the widenings directed towards each other is twisted downwards and one is twisted upwards. FIG. 4 is an elevation of three juxtaposed conductor ends of which the conductors are twisted. The wires between the conductor body and the conductors may be connected both prior to and after bringing the widened parts at different levels. Providing the wires beforehand is simpler. The insulation can furthermore be obtained through other means. For example, a strip having a small width may be removed from the connection strip, for example, by means of a laser beam, or differently.

The connection strip between the conductors need not be constructed as a closed frame. Essential is that the conductors extend to near the support and that at least those conductors which are embedded in the synthetic resin over a large length are very readily anchored on their free ends.

Figure 5:
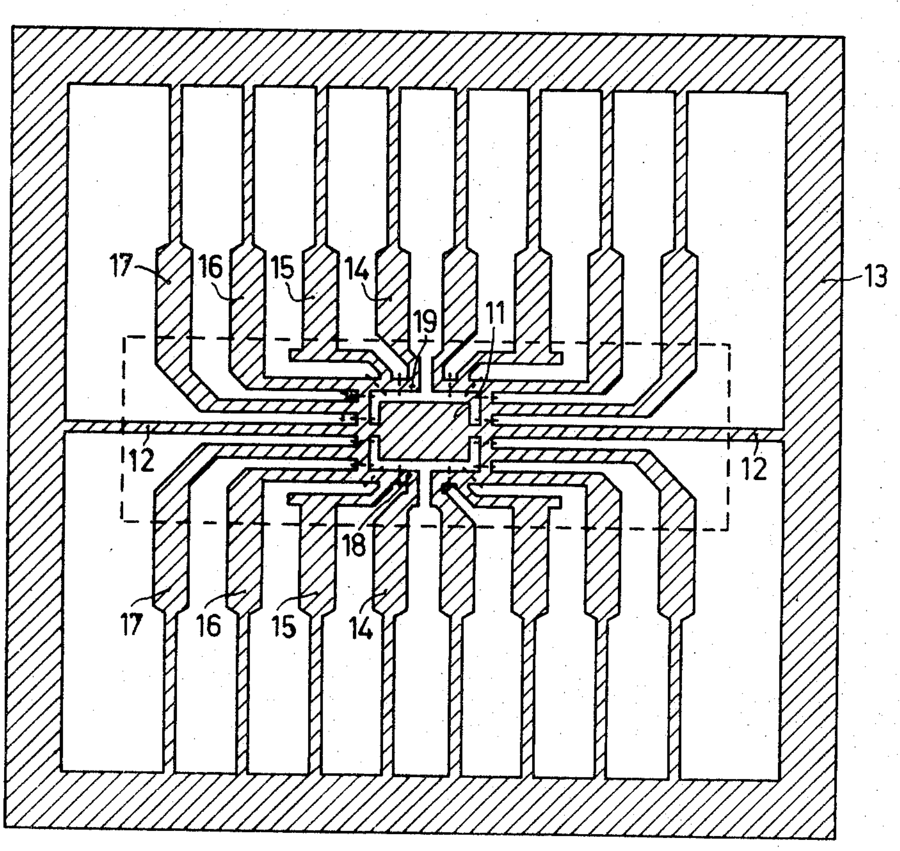
FIG. 5 shows another embodiment of a grid.

An example of a conductor grid in which the connection strip consists of several parts is shown in FIG. 5. The support 11 is connected to a supporting number 13 in the form of a frame by means of bands 12. The conductors 14–17 are connected with one end in the frame 13, their other end opens into connection strips 18 and 19, respectively. So in this case the connection strip consists of two parts. The places where the connection strip is cut are again shown in broken lines. The mutual insulation of the widened parts of the conductors can be carried out in the above-described manners. If, for example, the insulation is carried out in a manner similar to that shown in FIG. 2 relative to the grid of the first embodiment, the support 11 is deepened by providing a bend in the bands 12, and the widenings of the conductors 14 and 16 are bent upwards.

Figure 6:
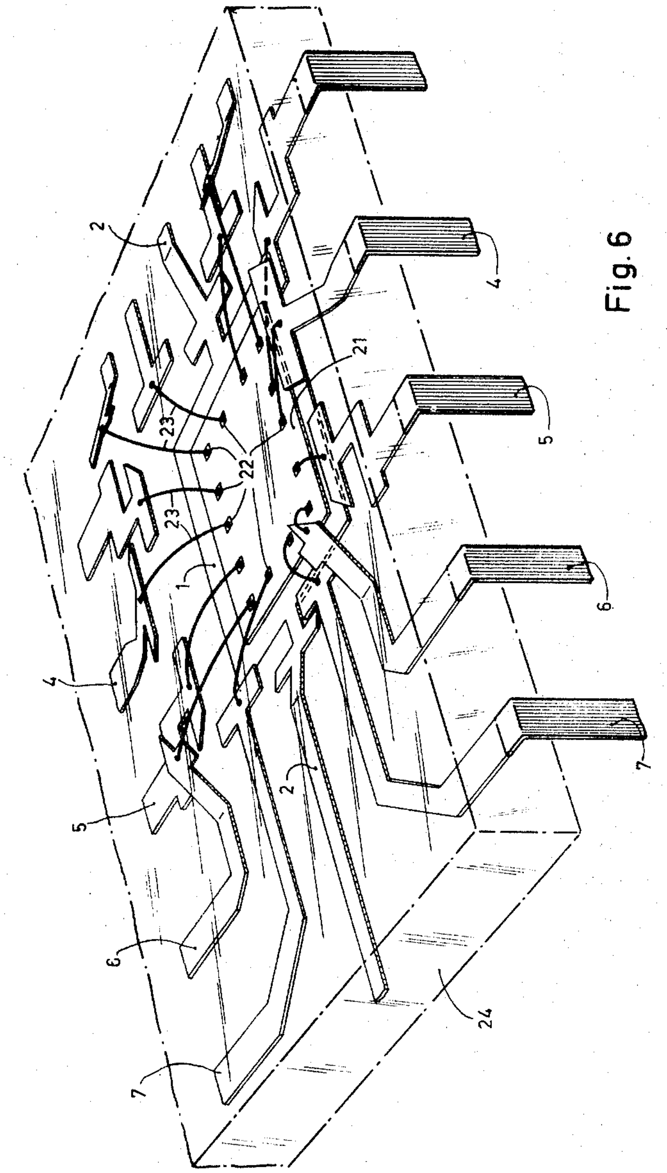
FIG. 6 is a perspective view of a semiconductor device according to the invention.

FIG. 6 shows a semiconductor device in which the grid of FIG. 1 is used. The shape of the widened conductor ends and the way of mutual insulation is clearly shown. The semiconductor 21 provided on the support 1 has contact places 22 which are electrically connected to the conductor ends by means of wires 23. The envelope of synthetic resin is denoted by 24. The parts of the conductors projecting beyond the envelope 24 are bent in two parallel rows in normal manner.

The grids shown are suitable for a semiconductor body which comprises an integrated circuit. The invention is not restricted to integrated circuits. For example, the invention may also be used in manufacturing a transistor.

Figure 7:
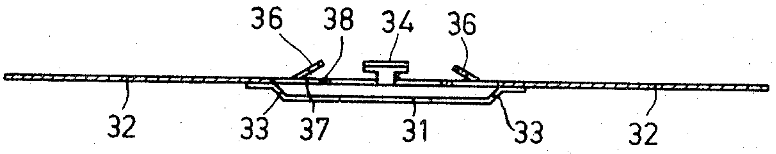
FIG. 7 is a conductor grid having a separately shaped support.

In the figures described, the support is shown as an integral part of the conductor grid. This is not necessary either. FIG. 7 is a sectional view of a conductor grid in which a separately manufactured support 31 is welded to bands 32 by means of connection strips 33. The structure of the conductor grid is the same as that of the grid shown in FIG. 1 but the bands 32 do not continue up to the connection strip 38. In FIG. 7 a part of the conductor 37 is thus visible. Such a construction may present important advantages. Now it is necessary only for the support to be manufactured from the comparatively expensive iron-nickel-cobalt alloy. The conductor grid may consist, for example, of a cheaper iron-nickel alloy or of copper. In addition, the conductor grid may be gold-plated less strongly than the support, which is cost-saving.

What is claimed is:

1. A method of providing conductor leads for a semiconductor body, comprising:

forming a spaced pattern of conductor leads having a first supporting strip connecting the ends of said leads intended to be remote from the semiconductor body and having a second supporting strip connecting the other ends of said strips intended to be electrically connected to said semiconductor body;

severing said second supporting strip into segments, each segment thereof being connected to an individual conductor lead, thereby forming widened ends for said conductor leads to assure rigid support for said other ends of said leads upon encapsulation thereof;

increasing the physical separation between adjacent edges of adjacent widened ends formed by said severing by moving at least one of each of said adjacent edges relative to the other of said adjacent edges;

positioning said widened ends adjacent said semiconductor body and electrically connecting conductive wires from said widened ends to desired locations on said semiconductor body; and encapsulating said widened ends and said connecting conductive wires to said semiconductor body in an insulating encapsulant.

2. A method as defined in claim 1 wherein said step of increasing the physical separation comprises the step of bringing said adjacent edges of said adjacent widened ends to mutually different positional levels.

3. A method as defined in claim 1 wherein said step of increasing the physical separation comprises twisting said widened ends about the axes of said conductor leads.

4. A method as defined in claim 1 wherein said step of increasing the physical separation comprises bringing said adjacent widened ends to mutually different planes.

5. A method as defined in claim 1 wherein said step of increasing the physical separation comprises bending at least alternate widened ends.

6. A method as defined in claim 1 wherein said step of increasing the physical separation comprises bending at least alternate conductor leads near the widened ends thereof.

7. A method as defined in claim 1 further comprising after the encapsulating step the further step of removing said first supporting strip from said conductor leads.

* * * * *